July 16, 1940. A. VON PICHLER-TENNENBERG 2,208,352
DEVICE FOR COMPENSATING THE PRESSURE IN WATER DECOMPOSERS
Filed Aug. 22, 1936
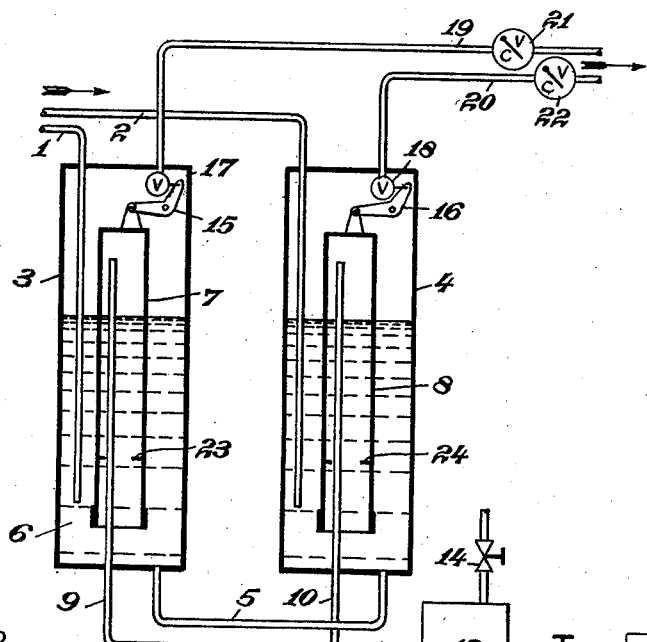
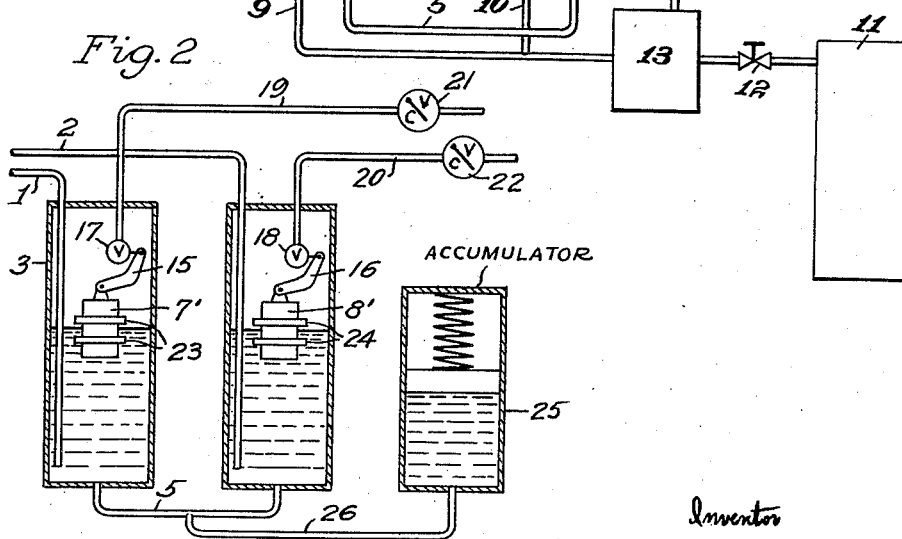
Inventor
Alarich von Pichler-Tennenberg
by Knight Bros
attorney Patented July 16, 1940

2,208,352

UNITED STATES PATENT OFFICE 2,208,352

DEVICE FOR COMPENSATING THE PRESSURE IN WATER DECOMPOSERS

Alarich von Pichler-Tennenberg, Berlin-Charlottenberg, Germany, assignor to Siemens & Halske, Aktiengesellschaft, Siemensstadt, near Berlin, Germany, a corporation of Germany Application August 22, 1936, Serial No. 97,478
In Germany August 24, 1935

5 Claims. (Cl. 137—78)

My invention relates to a device for compensating the pressure in water decomposers.

Various methods have already been proposed for compensating the pressure in water decomposers, particularly for high-pressure operation. Besides electromagnetically controlled valves, for instance, also diaphragm valves have been proposed. Such devices for equalizing the pressure hitherto employed leave, however, much to be desired as to the reliability, simplicity of design and control, etc.

An object of the invention is to provide a device for accurately regulating the pressure in electrolytic water decomposers by means of simple design and reliable operation. Another more particular object is to maintain the pressure in a water decomposer constant and equal to that of a loading pressure, and, further, to provide means for adjusting the loading pressure, i. e. the magnitude of the pressure to be kept constant. An object, finally, is to render possible the use of a pressure-equalizing storage container of great capacity, as compared with the amount of electrolytical gas production, without foregoing sensitivity and accuracy of the pressure regulation effected.

According to the invention a pressure-equalizing vessel consisting of a U-shaped container is inserted between the water decomposer and the gas delivery conduits, the container being filled with liquid and provided with pressure-tight limbs each containing a floating bulb controlling a gas outlet valve between the decomposer and the gas delivery conduit. The floating bulb is, on the one hand, under the pressure of the electrolytically produced gas and, on the other hand, under an adjustable counter-pressure, for instance, the pressure of a neutral gas which does not substantially diffuse in the filling liquid.

A device according to the invention has the advantage that although a comparatively great gas volume is contained therein, the percentage of the electrolytically produced gas may be kept low if a correspondingly greater volume of a neutral gas, for instance nitrogen, is employed for producing the counter-pressure. The reliability of the device ensured by the fact that even very small differences in pressure of the electrolytically produced gases in the gas chambers of the equalizing vessel cause the device to operate and to bring about a speedy equalization of pressure.

The invention will be more clearly understood from the accompanying drawing in which Figs. 1 and 2 represent two different embodiments of my invention in diagrammatic form.

Referring at first to Fig. 1, 1 and 2 designate conduits coming from an electrolytic decomposer for supplying the electrolytically produced oxygen and hydrogen to the pressure-tight limbs 3 and 4 of a U-shaped vessel 5. The conduits 1 and 2 terminate below the level of the filling liquid 6 of the container 5. Water may, for instance, be chosen as filling liquid. As will be seen from the drawing the limbs 3 and 4 of the vessel 5 are considerably enlarged as compared to the lower conduit connecting the limbs so as to enable a filling up with a relatively great total gas volume.

In each limb 3 and 4 is placed a floating bulb 7 and 8 into which extend conduits 9 and 10. The open end of the conduits 9 and 10 lies above the liquid level. Both conduits 9 and 10 serve to supply a counter-pressure gas, for instance nitrogen or another neutral gas which does not appreciably diffuse in the filling liquid 6. The counter-pressure gas is taken from a flask 11 and enters first an intermediate container 13 provided with a hand-operated gas discharge valve 14 through an adjustable valve 12.

The floating bulbs 7 and 8 control the valves 17 and 18 by means of bell crank levers 15 and 16. The valves 17 and 18 connect the upper gas space of the limbs 3 and 4 with outlet conduits 19 and 20 extending to the point from which gas is to be delivered. The outlet conduits are provided with check valves 21 and 22.

The operation of this pressure equalizer is as follows:

By actuating the valve 12 so much counter-pressure gas is first taken from the flask 11 and is supplied to the limbs 3 and 4 as to bring about therein an adjustment of the desired initial counter-pressure. At the beginning the floating bulbs 7 and 8 have the highest position in which they close the valves 17 and 18. This position is shown in the drawing. As soon as electrolytically produced gases flow into the limbs 3 and 4 through the conduits 1 and 2 they exert a pressure on the liquid surface, lowering the liquid level in both limbs and causing the liquid level in the floating bulbs 7 and 8 to rise. Accordingly, the floating bulbs 7 and 8 move in a downward direction and open the valves 17 and 18 so that electrolytically produced gases may flow from the upper part of the limbs 3 and 4 into the gas outlet conduits 19 and 20. By steadily increasing the counter-pressure any operating pressure may be thus adjusted.

If the flow of both electrolytically produced gases to the outlet is non-uniform a displacement of the liquid level in both limbs will occur, thus causing the bulb at the side where the pressure is low to move upward and at the side where the pressure is high to move downward, since the counter-pressure in both bulbs remains equal. This movement of the bulbs causes one of the valves 17, 18 to be closed and the other to be opened in such a manner that the desired compensation of pressure is reestablished. The pressure in limbs 3 and 4 of the U-shaped container is thus kept constant and equal to the adjusted loading or counter-pressure.

It is preferable to design the valves in such a manner that their governing effect between the closed and open valve positions changes as uniformly as possible. The valves then adjust themselves under normal operating conditions to an intermediate position corresponding to the operating pressure and the production of gas, thus ensuring a continuous uniform delivery of gas. So long as this intermediate position is not attained under normal working conditions the valves are more or less opened to supply a correspondingly greater or smaller amount of gas.

The embodiment shown may be modified in various ways; for instance, the electrolytically produced gases may be supplied to the interior of the floating bulbs 7 and 8, and the counter-pressure gas to the limbs 3 and 4, so that it acts on the outer side of the floating bulbs.

It is also possible to operate the device without counter-pressure gas by connecting a fluid pressure accumulator preferably to the lower conduit connecting both limbs 3 and 4. In this case normal floats may be used instead of the floating bulbs 7 and 8. An arrangement of such type is illustrated in Fig. 2. This arrangement is similar to that of Fig. 1, as is apparent from the reference numerals identical in both figures, except that ordinary, i. e. closed, floating bulbs 7' and 8' are employed and that the device for producing the load or counter-pressure consists of a pressure accumulator 25 which is connected with conduit 5 by means of a conduit 6. The operation of this arrangement is substantially similar to that of the aforedescribed embodiment To avoid an intermittent movement of the floating bulbs or floats when the delivery varies non-uniformly it is preferable to provide the same with baffle plates of convenient number and form. Examples of such plates are designated in Figs. 1 and 2 by 23 and 24.

I claim as my invention:

1. A device for compensating and regulating the pressure of gases produced by an electrolytic water decomposer having two gas outlets, comprising a U-shaped container for liquid, said container having two pressure-tight limbs and a free communication for said liquid between said limbs, each of said limbs having a gas inlet conduit to be connected with a different one of said two gas outlets of the water decomposer, a gas outlet conduit, a valve controlling said outlet conduit, and a float operatively connected with said valve for controlling said valve in accordance with the level of said liquid, in combination with a pressure generator connected with said container for exerting on said liquid a counter-pressure tending to compensate the gas pressure acting upon the level of the liquid in each of said limbs, and means associated with said pressure generator for adjusting said counter-pressure.

2. A device for compensating and regulating the pressure of gases produced by an electrolytic water decomposer, comprising a U-shaped container having two freely communicating pressure-tight limbs adapted to be partly filled with liquid, a floating bulb arranged in each of said limbs and dividing the interior of each limb into two gas chambers separated from each other by said liquid, an inlet conduit allotted to each of said limbs for supplying gas to one of said chambers and being disposed to be connected with the water decomposer, an outlet conduit for each of said limbs connected with the same chamber as said inlet conduit, a valve allotted to each of said outlet conduits for controlling said outlet conduits, said valve being operatively connected with said floating bulb, and an adjustable device for supplying a counter-pressure gas substantially not diffusing with said liquid to said other chamber of each limb in order to compensate and regulate the pressure of the gases passing from said water decomposer through said limbs.

3. A device for compensating and regulating the pressure of gases produced by an electrolytic water decomposer, comprising a U-shaped container adapted to be partly filled with liquid and forming two pressure-tight limbs and a communicating connection between said limbs, a floating bulb disposed in each of said limbs, each of said limbs having an inlet conduit and an outlet conduit, both conduits opening into the limb space surrounding said bulb, said inlet conduit being disposed to be connected to one of the gas supplies of the water decomposer, a valve disposed in each limb for controlling the opening of said outlet conduit, said valve being operatively connected with the floating bulb of said limb so as to control said opening according to changes of the level of the liquid within said limb, a third conduit arranged in each of said limbs underneath said floating bulb so as to open into the inner space of said bulb, a device for supplying through said latter conduit an auxiliary gas substantially not diffusing with said liquid for exerting a counter-pressure to said liquid counteracting the pressure of the gases flowing through said inlet and outlet conduits, and pressure controlling means associated with said device for adjusting the counter-pressure of said auxiliary gas.

4. A device for compensating and regulating the pressure of gases produced by an electrolytic water decomposer, comprising a U-shaped container adapted to be partly filled with liquid and forming two pressure-tight limbs and a communicating connection between said limbs, a floating bulb disposed in each of said limbs, each of said limbs having an inlet conduit and an outlet conduit, both conduits opening into the limb space surrounding said bulb, said inlet conduit being disposed to be connected to one of the gas supplies of the water decomposer, a valve disposed in each limb for controlling the opening of said outlet conduit, said valve being operatively connected with the floating bulb of said limb so as to control said opening according to changes of the level of the liquid within said limb, another conduit arranged in each of said limbs and having its opening underneath the bulb of said limb, an intermediate container for an auxiliary counter-pressure gas connected with said two other conduits, said container having a discharge valve and a regulating valve disposed to connect said container with a gas storage tank for supplying said auxiliary gas.

5. A device for compensating and regulating the pressure of gases produced by an electrolytic water decomposer, comprising in combination a U-shaped container adapted to be provided with liquid and forming two pressure-tight limbs and a communicating connection for said liquid between said limbs, each of said limbs having a gas inlet disposed to be connected with one of the two gas outlets of the water decomposer, and a gas outlet, a valve controlling said outlet, and a float operatively connected with said valve in order to control said outlet in accordance with the level of said liquid, in combination with a liquid pressure accumulator connected with the liquid-containing portion of said container and designed for exerting a counter-pressure on said liquid compensating the pressure exerted by said gases.

ALARICH V. PICHLER-TENNENBERG.